United States Patent [19]

Yamazaki

[11] Patent Number: 4,991,024

[45] Date of Patent: Feb. 5, 1991

[54] CRT DISPLAY DEVICE

[75] Inventor: Eiichi Yamazaki, Ichihara, Japan

[73] Assignee: Hitachi, Ltd., Tokyo, Japan

[21] Appl. No.: 862,179

[22] Filed: May 12, 1986

Related U.S. Application Data

[63] Continuation of Ser. No. 558,279, Dec. 5, 1983, abandoned.

[30] Foreign Application Priority Data

Dec. 8, 1982 [JP] Japan ............................ 57-213915

[51] Int. Cl.[5] ............................................ H04N 5/64

[52] U.S. Cl. .................................. 358/255; 358/254

[58] Field of Search .................... 358/242, 254, 255; 340/712, 720; 313/477 R, 474, 477; 220/2.1 A; 312/7.2

[56] References Cited

U.S. PATENT DOCUMENTS

| | | | |
|---|---|---|---|
| 2,239,887 | 4/1941 | Ferrant | 358/242 |
| 2,342,778 | 2/1944 | Wolff | 358/242 |
| 2,805,411 | 9/1957 | Rose | 312/7.2 X |
| 3,041,496 | 6/1962 | Creamer, Jr. et al. | 358/254 |
| 3,541,256 | 11/1970 | Anders | 312/7.2 X |
| 4,440,457 | 4/1984 | Fogelman et al. | 312/7.2 |
| 4,453,789 | 6/1984 | Gullong | 312/7.2 X |

FOREIGN PATENT DOCUMENTS

| | | | |
|---|---|---|---|
| 2313831 | 12/1976 | France | 358/254 |
| 2496432 | 6/1982 | France | 312/7.2 |
| 563971 | 12/1956 | Italy | 358/255 |

*Primary Examiner*—James J. Groody
*Assistant Examiner*—Mark R. Powell
*Attorney, Agent, or Firm*—Antonelli, Terry, Stout & Kraus

[57] ABSTRACT

A CRT display device has a phosphor plane of a bulb inclined to a plane normal to a center axis of an electron gun structure and a side of the bulb facing the phosphor plane inclined to the phosphor plane. A transmissive window for passing a light from the phosphor plane to an external is formed in the side of the bulb.

7 Claims, 2 Drawing Sheets

CRT DISPLAY DEVICE

This application is a continuation of application Ser. No. 558,279, filed Dec. 5, 1983, now abandoned.

The present invention relates to a cathode ray tube (CRT) display device.

As shown in a sectional view of FIG. 1, a CRT used in a display device has a phosphor plane 3 deposited on an inner surface of a face panel 2 of a CRT 1 and arranged generally orthogonally to a center axis of an electron gun structure 4. Accordingly, the phosphor plane 3 is excited by electron beams emitted from the electron gun structure 4 and a fluorescent light emitted thereby is observed by an observer through the face panel 2 having the phosphor plane 3 applied thereon. When such a CRT 1 is used in the display device, it is accommodated in a case 7 having a keyboard for controlling the CRT or arranged on the case.

However, in the display device which uses the CRT of FIG. 1, the size of the display device is large, that is, the length and the height are large because of large length and height of the CRT. Further, since an external surface of the face panel 2 reflects an external light, an image on the CRT is hard to observe.

It is an object of the present invention to provide a CRT display device which enables to compact the display device and prevents reflection on a surface of a face panel of the CRT.

In order to achieve the above object, in accordance with the CRT display device of the present invention, a phosphor plane of the CRT inclines to a plane normal to a center axis of an electron gun structure, a side of the CRT facing the phosphor plane inclines to the phosphor plane and a transmissive window for passing a light from the phosphor plane to an external is formed on the side of the CRT.

The above and other objects, features and advantages of the present invention will be more apparent from the following description with reference to the accompanying drawings, in which.

Preferred embodiments of the present invention will now be described with reference to the drawings.

Figure 1:
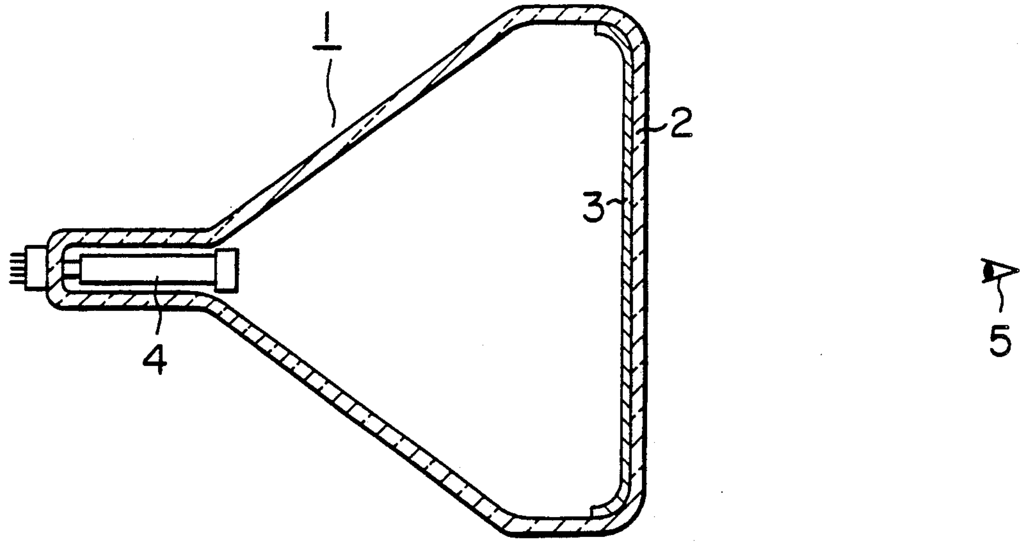
FIG. 1 PRIOR ART
FIG. 1 is a sectional view of a typical example of a prior art CRT.
Figure 2:
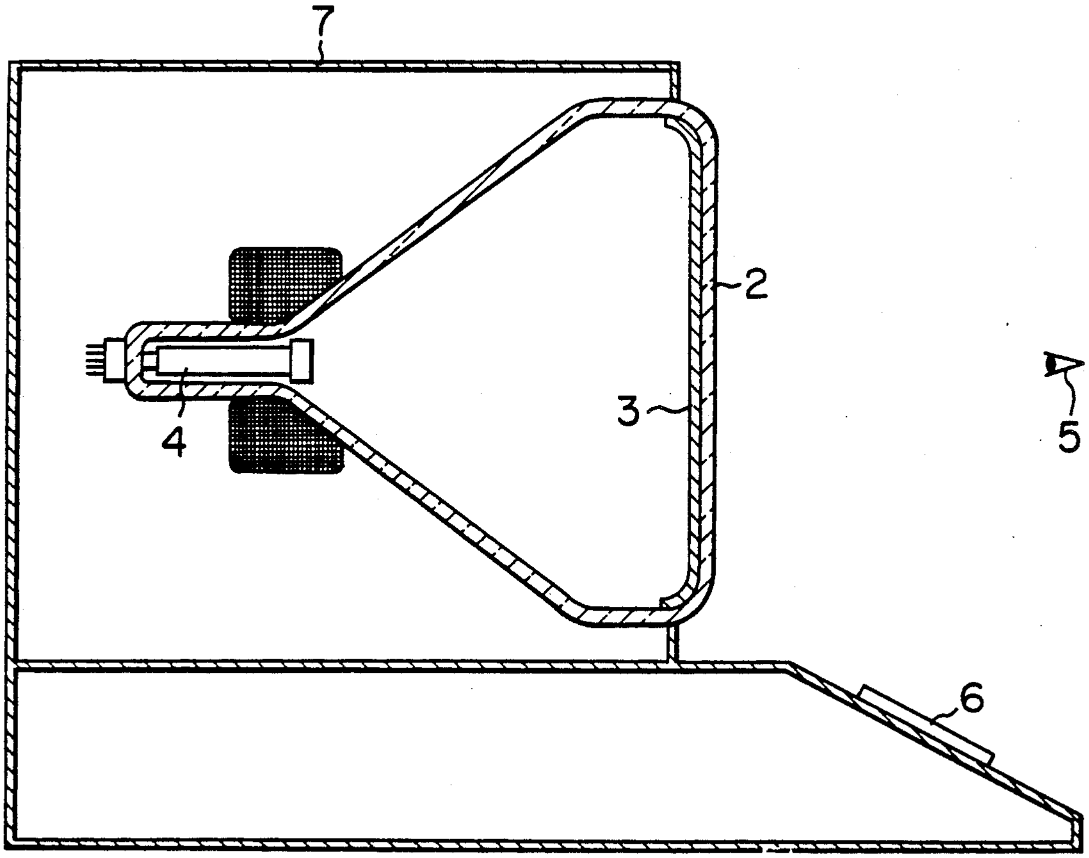
FIG. 2 PRIOR ART
FIG. 2 is a sectional view of a display device which uses the prior art CRT.
Figure 3:
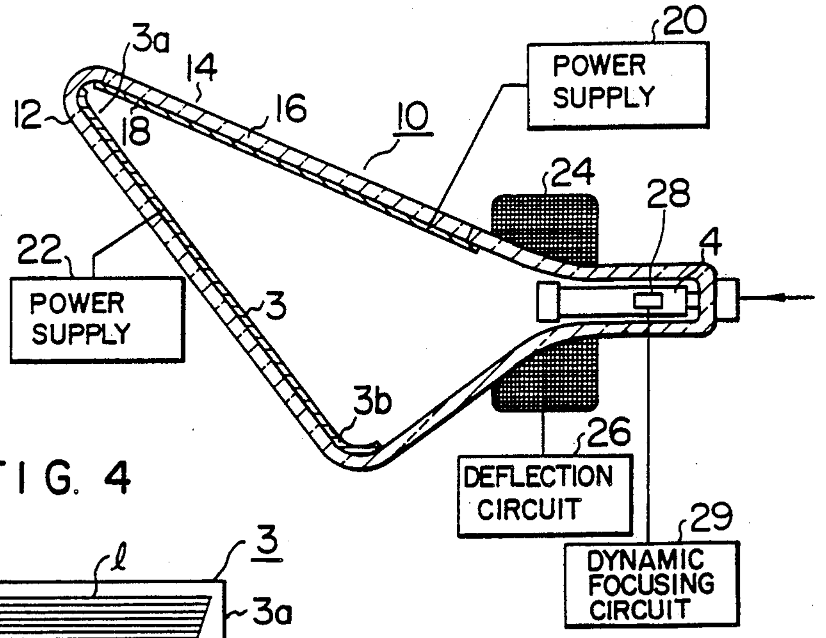
FIG. 3 is a sectional view of one embodiment of a CRT display device of the present invention.

FIG. 3 is a sectional view of one embodiment of a CRT display device in accordance with the present invention. The like elements to those shown in FIG. 1 are designated by the like numerals and explanation thereof is omitted. The CRT display device 10 has the phosphor plane 3 inclined to a plane normal to the center axis of the electron gun structure 4 shown by a chain line, a side wall 14 of a bulb 12 facing the phosphor plane 3 is inclined with respect to the phosphor plane 3. A transmissive window 16 of transparent glass for passing a fluorescent light from the phosphor plane 3 is formed in the side wall 14. The transmissive window 16 is flat over an entire area so that an entire area of the phosphor plane 3 can be uniformly viewed. A transparent conductive film 18 is deposited on an inner surface of the transmissive window 16, and a high voltage is applied to the transparent conductive film 18. The transparent conductive film 18 may be a nesa film. A voltage may be applied to the transparent conductive film 18 by a DC power supply 20 to prevent unnecessary charges from being charged on an inner surface thereof. The voltage applied to the transparent conductive film 18 may be substantially equal to a voltage applied to an inner surface of the phosphor plane 3 by a DC power supply 22.

As the electrons are emitted from the electron gun structure 4, a DC voltage corresponding to a raster position of the beam on the phosphor plane 3 may be applied to the conductive film 18 so as to control the deflection of the beam. In this case, an AC power supply which generates a variable voltage in accordance with the raster position of the beam may be used instead of the DC power supply 20. The voltage applied to the conductive film 18 by the DC or AC power supply may be set to the lower than the voltage applied to the phosphor plane 3 so as to make the beam incident into the plane 3 with an angle closer to 90 degrees.

Figure 4:
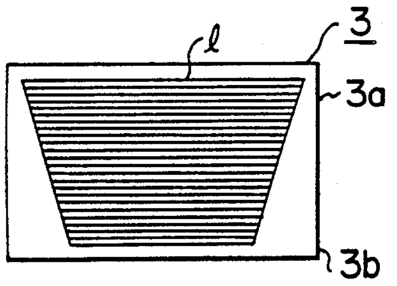
FIG. 4 shows a raster pattern.

In the CRT display device 10 thus constructed, the electron beams are deflected by a deflection yoke 24 to raster-scan the phosphor plane 3. Since the phosphor plane 3 inclines to the plane normal to the center axis of the electron gun structure 4, a raster pattern is of sector shape. As shown in FIG. 4, the raster pattern is of sector shape as a whole with an upper portion 3*a* of the phosphor plane 3 having a longer length of a horizontal scan line l. Thus, a deflection circuit 26 which supplies a deflection current to a deflection coil 24 produces a correction current in accordance with the raster position in superposition to the deflection current so that the horizontal scan line length is constant irrespective of the raster position on the phosphor plane.

Since the phosphor plane 3 inclines to the plane normal to the center axis of the electron gun structure 4, that is, the distance from the electron gun structure 4 to the phosphor plane 3 at the upper portion 3*a* is substantially different from that at a lower portion 3*b*, the beams are not focused on the phosphor plane 3 at all raster positions and a beam spot is defocused. Thus, a dynamic focusing circuit 29 which supplies a dynamic focusing voltage to a focusing electrode 28 produces a correction voltage in accordance with the raster position in superposition to the normal DC focusing voltage so that the beams are focused on the phosphor plane at all raster positions. Incidentally, this dynamic focusing may be performed by means of an electromagnetic system including focusing coils excited by a dynamic focusing current instead of electrostatic system described above. In this manner, the raster distortion and the defocusing can be corrected and the length (from the electron gun structure to the phosphor plane) and the height of the CRT display device can be reduced.

Figure 5:
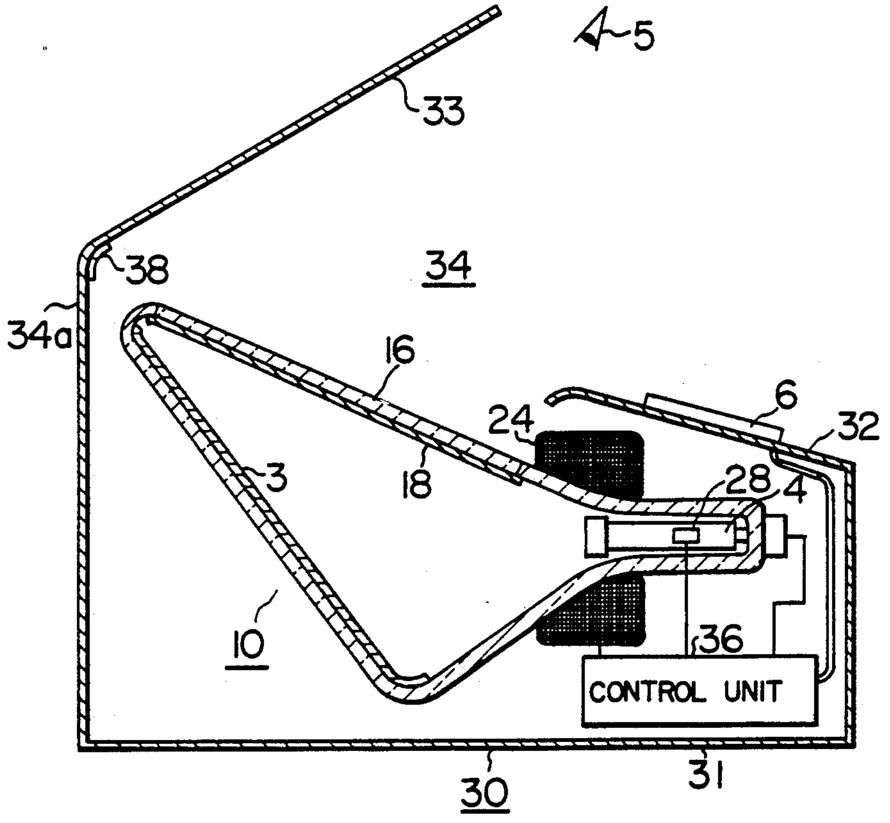
FIG. 5 is a sectional view of another embodiment of a CRT display device of the present invention.

Another embodiment of a CRT display device 10 is shown in FIG. 5. The CRT display device 10 of FIG. 3 and a drive unit therefor are accommodated in a casing 30, which has a portion 31 having a U-shaped section and an upper opening 34. A first hood 33 extends from one end 34*a* of the opening 34 upwardly obliquely, and a second hood 32 extends from other end upwardly obliquely. A keyboard 6 for controlling the CRT is mounted on the second hood 32. In the casing 30, the electron gun structure 4 of the CRT display device 10 is arranged below the keyboard 6 and the transmission window 16 is arranged to face the opening 34 which opens upwardly obliquely toward a viewer 5.

A control unit 36 (including the deflection circuit 26 etc. of FIG. 3) for controlling the CRT in accordance with an instruction from the keyboard 6 may be accommodated in a space below the hood 32 or a space below the phosphor plane 3.

In the display device (for example, a word processor character display) thus constructed, the electrons emitted from the electron gun structure 4 bombard to the phosphor plane 3 to emit a fluorescent light so that an image is observed by the viewer 5 through the transmissive window 16.

Since the phosphor plane 3 of the CRT inclines to the plane normal to the center axis of the electron gun structure 4 and the transmissive window 16 is formed in the side wall 14 which obliquely faces the phosphor plane 3, the electron gun structure 4 can be arranged in the casing 30 below the keyboard and the transmissive window 16 can be arranged in the opening 34. Accordingly, the display device is compact and a portable display device is provided. That is, the length (along the direction of radiation of the electron beams) and the height of the casing can be reduced.

Since the hood 33 is arranged in the opening 34 of the casing 30, the reflection of the external light from the top of the opening 34 by the surface of the transmissive window 16 of the CRT is prevented. Accordingly, the reflection of the light to the viewer 5 can be completely prevented without forming a non-glare coating or an anti-reflection coating on the surface of the transmissive window 16.

The hood 33 may be attached to the end 34*a* of the casing 30 by a hinge 38. In this case, the hood 33 may be folded to close the opening 34 when the display device is not used in order to protect the CRT. A mechanism for automatically opening the closed hood 33 in response to the turn-on of a power switch (not shown) of the display device may be provided. Alternatively, the power switch may be linked to the hood 33 so that the power of the display device is turned on when the hood is opened and turned off when the hood is closed.

A mirror may be arranged in a plane facing the transmissive window 16 to reflect the fluorescent light transmitted from the phosphor plane 3 through the transmissive window 16 by the mirror so that the reflected image can be observed at a distant point.

With the present CRT display device 10, the viewer 5 observes the phosphor plane 3 from the side of the incident plane of the electron beams. Since the back surface of the phosphor plane 3 is constructed by a rough surface of the phosphor particles, there is no risk that the external light is reflected by the phosphor plane and reaches the viewer. A filter film may be arranged on the outer surface of the transmissive window 16 of the CRT to improve a contrast of the image.

A printer may be arranged in a space in the casing below the phosphor plane 3 to print out the display image of the CRT on a print paper, which may be fed upward along the hood 33.

While the image is displayed on the phosphor plane 3 monochromatically in the above embodiment, the image may be displayed in color by a beam index technique, in which case the same advantage is attained.

As described hereinabove, according to the present invention, the compact display device which could not be attained with the prior art CRT display device is provided. The reflection on the surface of the face panel is essentially prevented and a high quality of image is presented.

I claim:

1. A compact CRT display device having a direct view CRT including a phosphor plane deposited on an inner surface of a bulb, an electron gun structure arranged to face said phosphor plane for emitting electron beams to said phosphor plane and deflection means for deflecting said electron beams, wherein said phosphor plane of aid bulb inclines too a vertical plane and deflection means for deflecting said electron beams, wherein said phosphor plane of aid bulb inclines to a vertical plane normal to a center axis of said electron gun structure, a side of said bulb facing said phosphor plane inclined to said phosphor plane, a transmissive window for passing a light from said phosphor plane externally of the device at said side of said bulb, and a casing for accommodating said CRT, said casing having an opening arranged in a plane facing said transmissive window and a hood extending from an end of said opening opposite to said electron gun structure at an acute angle to and over said transmissive window, such that reflection of external light beams from a position behind the hood and a substantial amount of external light reflected by said transmissive window is not seen by an observer facing the transmissive window;

wherein a transparent electroconductive film is deposited on an inner surface of said transmissive window.

2. A CRT display device according to claim 1, wherein said transparent electroconductive film is applied with a DC voltage from a DC voltage source so as to prevent unnecessary charges on an inner surface thereof.

3. A CRT display device having a CRT including a phosphor plane deposited on an inner surface of a bulb, an electron gun structure arranged to face said phosphor plane for emitting electron beams to said phosphor plane and deflection means for deflecting said electron beams, wherein said phosphor plane of said bulb inclines to a plane normal to a center axis of said electron gun structure, a side of said bulb facing said phosphor plane inclines to said phosphor plane, a transmissive window for passing a light from said phosphor plane to an external is formed in said side of said bulb, a transparent electroconductive film is deposited on an inner surface of said transmissive window, and said transparent electroconductive film is applied with a DC voltage from a DC voltage source which corresponds to a raster position of the beam on said phosphor plane so as to control the deflection of the beam.

4. A CRT display device according to claim 1, wherein said casing includes a bottom panel approximately parallel to the axis of said electron gun structure, a first side panel extending from one end of said bottom panel to a top portion of said phosphor plane approximately vertically thereto and facing said phosphor plane, a second side panel extending from the other end of said bottom panel to top portion of said electron gun structure approximately vertically thereto and facing said electron gun structure, a top panel extending from a top end of said second side panel to the other end of said opening so as to cover said electron gun structure, and said hooked extending from a top end of said first side panel to said electron gun structure over said transmissive window, wherein said phosphor plane inclines to said second panel at a first angle smaller than 90 degrees and said side of said bulb inclines to said second side panel by a second angle smaller than said first angle.

5. A CRT display device according to claim 4, wherein said hood is pivotable around said top end of said first side panel between a first position to cover said transmissive window and a second position to expose said transmissive window.

6. A CRT display device according to claim 5, further comprising a control panel disposed on said top panel for controlling said CRT.

7. A CRT display device according to claim 6, further comprising a control unit for controlling said CRT in accordance with instructions delivered from said control panel, said control unit being disposed in a space surrounded by said electron gun structure, said second side panel and said bottom panel.

* * * * *